United States Patent [19]
Wadowski

[11] Patent Number: 4,618,265
[45] Date of Patent: Oct. 21, 1986

[54] HEXIDECIMAL CLOCK, AND METHODS OF CONSTRUCTING AND UTILIZING SAME

[76] Inventor: Richard A. Wadowski, 33281 Karin Dr., Apt. 205, Sterling Heights, Mich. 48077

[21] Appl. No.: 811,728

[22] Filed: Dec. 20, 1985

[51] Int. Cl.[4] .................. G04C 19/00; G04C 15/00
[52] U.S. Cl. ........................................ 368/82; 368/155
[58] Field of Search .................. 368/10, 62, 82–84, 368/155–157, 239–242

[56] References Cited

U.S. PATENT DOCUMENTS 3,976,867  8/1976  Campbell ............................. 368/9
4,099,371  7/1978  Mochizuki et al. ................. 368/251

Primary Examiner—Vit W. Miska
Attorney, Agent, or Firm—Irving M. Weiner; Joseph P. Carrier; John J. Cantarella

[57] ABSTRACT

A clock which displays time in base sixteen for those familiar with hexidecimal, e.g., computer specialists or computer hobbyists.

21 Claims, 2 Drawing Figures

HEXIDECIMAL CLOCK, AND METHODS OF CONSTRUCTING AND UTILIZING SAME

BACKGROUND OF THE INVENTION

1. Field of the Invention

The present invention relates generally to time pieces. Specifically the invention is a clock which displays time in hexidecimal format, i.e., base 16.

Previously the common clock has been the only clock available to the general public. The common clock displays time in decimal format, i.e., base 10 and is generally understood by most individuals. However, with the advent of computers, and the proliferation of these into the home place, many individuals have become familiar with hexidecimal which is a base 16 number system that is used as a simplified way of expressing binary numbers and computer language program instructions by those primarily familiar with computers.

Applicant seeks to appeal to those individuals now familiar with counting in hexidecimal with his clock which displays time in a hexidecimal format. It is anticipated that such will be desired as a novelty item, and as a commercial unit in the computer industry.

2. Description of Relevant Art

The United States patents which are related to applicant's invention include: U.S. Pat. No. 3,573,791 which teaches a display system including a seven-bar indicator controlled by logic circuitry to selectively display in binary form coded input characters or to display the number of input characters registered into a register, i.e., it is a counter; U.S. Pat. No. 3,671,943 which teaches a graphic presentation of numbers in binary coded basimal form in such fashion that the binary encoding of each basimal digit forms a distinctive symbol easily recognizable to the human being as a number, i.e., it displays in roman numerals; U.S. Pat. No. 3,800,524 teaches a twelve hour clock that reads out in standard decimals; U.S. Pat. No. 4,159,471 teaches a transmission device which makes use of a ten element character form; U.S. Pat. No. 4,163,230 which teaches a display device for electronic timepieces, i.e., it is for displaying messages; and U.S. Pat. No. 4,420,750 which teaches an alphanumeric visual display of the matrix type, but does not teach a time keeper or a driver.

It may easily be concluded that the above-identified references do not disclose a hexidecimal clock or the relevant features of applicant's invention.

SUMMARY OF THE INVENTION

Applicant's hexidecimal clock includes a power supply circuit which reduces the incoming 12 volts of alternating current to 5 volts regulated direct current which is accomplished with a half-wave rectifier, a voltage regulator circuit and a microcapacitor. A voltage sample is taken off the 12 volt alternating current line prior to rectification and this sample is sent to a shaper unit the output of which is a sixty hertz square wave. It is then used by the timebase circuitry which divides by ten, three, and two. The output from the timebase is one hertz and is used to drive the seconds counter, clock set, and seconds reset circuitry.

Alternatively, a ten hertz sample may be taken from the timebase to drive the clock set circuitry in a fast set mode. The seconds counter contains the logic to count from 00 to 59, sense when the sixtieth second is reached, reset back to zero and send a clock pulse to the minutes counter. The hexidecimal decoder/driver converts the binary coded logic data to base 16 then displays the results on the seven segment light emitting diode. The minutes counter performs similar to the seconds counter. The hours counter is a preset counter which counts from one to twelve, the detection circuitry detects the thirteenth hour and presets the counter back to one. The hours counter also contains a hexidecimal decoder/driver which converts the binary coded logic data to base 16 and displays the results on the seven segment light emitting diode. The clock set circuitry contains a momentary contact switch used for the seconds reset and another such switch used for slow setting of minutes and hours. When both set buttons are pushed simultaneously, the fast set circuitry advances the minutes at a rate of ten per one second of real time. When the minutes reach hexidecimal "3b" equal to decimal 59, the hours will advance by one and the minutes will reset to zero. When the slow set button is pushed, the minutes display advances at a rate of one per second of real time. When the minutes reach hexidecimal "3b" the hours will again advance by one and the minutes will reset to zero. The seconds reset button may be used to reset the seconds to zero.

It is an object of the instant invention disclosure to provide a novelty item to the growing numbers of those familiar with hexidecimal as a result of increased computer usage.

DETAILED DESCRIPTION OF PREFERRED EMBODIMENTS

Figures 1, 2:
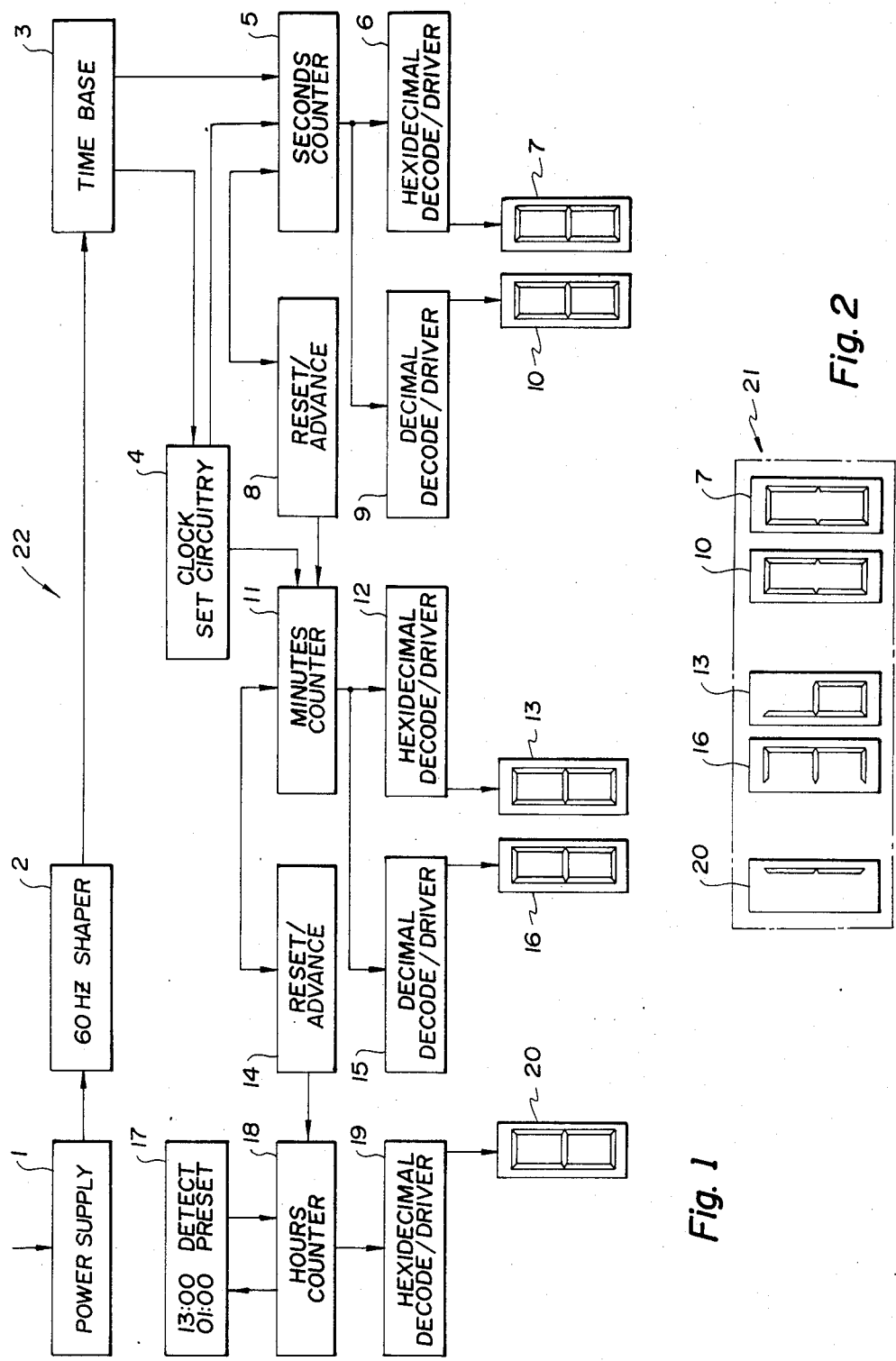
FIG. 1 is a boxed schematic drawing of the combination of units which comprise the hexidecimal clock, and the direction signals flow from unit to unit.
FIG. 2 is a front elevational view of the display of the hexidecimal clock which indicates a hexidecimal time from left to right which when translated into decimal reads: one hour fifty-nine minutes and zero seconds, or 1:59:00.

FIG. 1 depicts a boxed schematic of the circuitry comprising hexidecimal clock 22. Hexidecimal clock 22 is powered by a power supply one which includes a commercially available twelve volt alternating current 1 half ampere wall type transformer, a twenty-two-hundred microfarad twenty-five volt electrolytic capacitor, a five volt one and a half ampere voltage regulator, a transistor heat sink, and a one ampere fifty peak inverse voltage silicon rectifier. A sixty Hertz sine wave sample is taken from the power supply 1 prior to rectification and sent to a sixty Hertz shaper 2 which includes a ten thousand Ohm five percent tolerance quarter watt resistor, a one ampere fifty peak inverse voltage silicon rectifier, a $4.7 \times 10^{-3}$ microfarad fifty volt metal film disc capacitor, and a QUAD two input NAND schmitt trigger. The shaper 2 produces a sixty hertz square wave signal which is used by the time base unit three which divides by ten, three, and two, and includes the appropriate counters to do so. The time base unit 3 produces signals which are sent to the clock set unit 4 and the seconds counter 5. The clock set unit 4 includes a one ampere fifty peak inverse voltage silicon rectifier, a twenty-two Ohm five percent tolerance quarter watt resistor, and a single pole single throw normally open momentary contact pushbutton switch. The seconds counter 5 is a seven stage binary counter.

The clock set unit 4 is capable of sending a signal to both the seconds counter 5 and the minutes counter 11 when its normally open momentary contact switch is closed. The minutes counter 11 is a seven stage binary counter. The seconds counter 5 communicates with the reset/advance unit 8 which in turn sends appropriate signals to the minutes counter 11. The reset/advance unit 8 differs from reset/advance unit 14, as it includes a DUAL four input AND gate, and a QUAD two input OR gate, whereas the latter *does not* contain a QUAD two input OR gate.

The seconds counter 5 sends a signal to hexidecimal decoder/driver 6 which in turn sends a signal to light emitting diode 7, and this same signal also goes to decimal decoder/driver 9 which in turn sends a signal to light emitting diode 10. Hexidecimal decoder/driver 6, as well as 12 and 19 which are identical, includes a seven segment constant current decoder/driver/latch and a seventy-five Ohm five percent tolerance quarter watt resistor. Decimal decoder/driver 9 which is the same as 15 includes a binary coded decimal decoder/driver connecting to the seven segment light emitting diode and a one-hundred fifty ohm five percent tolerance quarter watt resistor.

The seconds and minutes counters 5 and 11 respectively contain the logic to count from 00 to 59, sense when the sixtieth second or minute is reached, reset back to 00 and send a signal to the minutes or hours counters 11 and 18 respectively. The hexidecimal decoder/drivers 6 and 12 convert the binary coded decimal logic data to base sixteen, and displays the results on the appropriate light emitting diode that being 7 and/or 13 respectively. Furthermore, seconds and minutes counters 5 and 11 respectively sends signals to decimal decoder/drivers 9 and 15 respectively which in turn display their signal on the light emitting diodes 10 and 16 respectively.

The minutes counter sends a signal to hexidecimal decoder/driver 12 and decimal decoder/driver 15 which in turn each send signals to light emitting diodes 13 and 16 respectively. Reset/advance 14 simultaneous with resetting the minutes counter to zero sends a signal to the hours counter 18 to advance one hour.

Hours counter 18 is in communication with detect/preset unit 17 which detects 13:00 at which time it presets the hour back to 1:00. The hours counter 18 includes a presettable UP/DOWN binary coded decimal counter. Detect/preset unit 17 includes a DUAL four input AND gate. The hours counter 18 sends a signal to hexidecimal decoder/driver 19 which in turn sends a signal to light emitting diode 20.

FIG. 2 shows display unit 21 comprising from left to right seven segment light emitting diodes 20, 16, 13, 10 and 7. Decimal display unit 21 displays 1:59:00, i.e., one hour fifty-nine minutes and zero seconds. To further understand the hexidecimal readout on display unit 21, reference should be made to Table A; Hexidecimal To Decimal Conversion disclosed on the following page.

All the units described above are connected by means well known in the art. Also, reference has been made to the elements which are ideally contained in each box, but are not themselves shown. Furthermore, only a preferred embodiment has been suggested above, and it is not meant to be the exclusive form of the invention. The invention will be best understood from a reading of the appended claims.

TABLE A

HEXIDECIMAL TO DECIMAL CONVERSION TABLE

| HEXIDECIMAL | DECIMAL |
|---|---|
| 00 | 00 |
| 01 | 01 |
| 02 | 02 |
| 03 | 03 |
| 04 | 04 |
| 05 | 05 |
| 06 | 06 |
| 07 | 07 |
| 08 | 08 |
| 0A | 10 |
| 0b | 11 |
| 0C | 12 |
| 0d | 13 |
| 0E | 14 |
| 0F | 15 |
| 10 | 16 |
| 11 | 17 |
| 12 | 18 |
| 13 | 19 |
| 14 | 20 |
| 15 | 21 |
| 16 | 22 |
| 17 | 23 |
| 18 | 24 |
| 19 | 25 |
| 1A | 26 |
| 1b | 27 |
| 1C | 28 |
| 1d | 29 |
| 1E | 30 |
| 1F | 31 |
| 20 | 32 |
| 21 | 33 |
| 22 | 34 |
| 23 | 35 |
| 24 | 36 |
| 25 | 37 |
| 26 | 38 |
| 27 | 39 |
| 28 | 40 |
| 29 | 41 |
| 2A | 42 |
| 2b | 43 |
| 2C | 44 |
| 2d | 45 |
| 2E | 46 |
| 2F | 47 |
| 30 | 48 |
| 31 | 49 |
| 32 | 50 |
| 33 | 51 |
| 34 | 52 |
| 35 | 53 |
| 36 | 54 |
| 37 | 55 |
| 38 | 56 |
| 39 | 57 |
| 3A | 58 |
| 3b | 59 |

I claim:

1. A hexidecimal time display apparatus, comprising:
a power supply;
first means for generating a timebase from said power supply operably connected thereto;
second means for detecting changes in time in seconds operably connected to said first means;
third means for counting seconds operably connected to said second means;
fourth means for counting minutes operably connected to said third means;
fifth means for counting hours operably connected to said fourth means;
sixth means for continuously resetting or advancing said third, fourth and fifth means a predetermined amount at a predetermined time operably connected thereto;

seventh means for converting the magnitude of said third, fourth and fifth means into at least three hexidecimal coded signals; and a plurality of displays to show the hexidecimal signals of said seventh means.

2. The apparatus of claim 1, wherein:
said third means includes a counter.

3. The apparatus of claim 2, wherein:
said fourth means includes a counter.

4. The apparatus of claim 3, wherein:
said fifth means includes a counter.

5. The apparatus of claim 4, wherein:
said sixth means includes logic for detecting a predetermined time at which it will set said counters to zero.

6. The apparatus of claim 4 wherein:
said seventh means includes means for decoding said counters, and
means for driving said plurality of displays.

7. The apparatus of claim 4 wherein:
said plurality of displays includes an array of light emitting diodes.

8. The apparatus of claim 5 wherein:
said seventh means includes means for decoding said counters; and
means for driving said plurality of displays.

9. The apparatus of claim 8 wherein:
said plurality of displays includes an array of light emitting diodes.

10. A time display apparatus, comprising:
a sixty Hertz electrical power supply;
a shaper operably connected to said power supply;
a timebase operably connected to said shaper;
a seconds counter operably connected to said timebase;
first means for resetting or advancing said seconds counter operably connected thereto;
a minutes counter operably connected to said first means;
second means for resetting or advancing said minutes counter operably connected thereto;
third means for setting said seconds counter and said minutes counter operably connected to both;
said third means is additionally operably connected to said timebase;
an hour counter is operably connected to said third means;
fourth means for detecting the reset time of said hour counter operably connected thereto;
fifth means for converting the output of said seconds counter into a hexidecimal signal operably connected thereto;
sixth means for converting the output of said minutes counter into a hexidecimal signal operably connected thereto;
seventh means for converting the output of said hours counter into a hexidecimal signal operably connected thereto; and
means for displaying the signals of said fifth, sixth, and seventh means.

11. The apparatus of claim 10, wherein:
said first means includes a DUAL four input AND gate, and a QUAD two input OR gate.

12. The apparatus of claim 10, wherein:
said second means includes a DUAL four input AND gate.

13. The apparatus of claim 10, wherein:
said third means includes a rectifier;
a resistor; and
a contact switch provided with a pushbutton for activation.

14. The apparatus of claim 10, wherein:
said fourth means includes a DUAL four input AND gate.

15. The apparatus of claim 10, wherein:
said fifth means includes a first seven segment constant current decoder;
said first seven segment constant current decoder is able to function as a driver and latch as necessary; and
a resistor of predetermined resistance.

16. The apparatus of claim 10, wherein:
said sixth means includes a second seven segment constant current decoder;
said second seven segment constant current decoder is able to function as a driver and latch as necessary; and
a resistor of predetermined resistance.

17. The apparatus of claim 10, wherein:
said seventh means includes a third seven segment constant current decoder;
said third seven segment constant current decoder is able to function as a driver and latch as necessary; and
a resistor of a predetermined resistance.

18. The apparatus of claim 10, wherein:
said display means includes an array of light emitting circuits.

19. The time display apparatus of claim 10, wherein:
said first means includes a DUAL four input AND gate, and a QUAD two input OR gate;
said second means includes a DUAL four input AND gate;
said third means includes a rectifier, a resistor, and a contact switch provided with a push button for activation;
said fourth means includes a DUAL four input AND gate;
said fifth means includes a first seven segment constant current decoder, said first seven segment constant current decoder is able to function as as driver and latch as necessary, and a resistor of predetermined resistance;
said sixth means includes a second seven segment constant current decoder, said seven segment constant current decoder is able to function as a driver and latch as necessary, and a resistor of predetermined resistance;
said seventh means includes a third seven segment constant current decoder, said third seven segment constant decoder is able to function as a driver and latch as necessary, and a resistor of predetermined resistance; and
said display means includes an array of light emitting diode circuits.

20. The apparatus of claim 19, wherein:
said light emitting circuits are a plurality of light emitting diodes.

21. The apparatus of claim 19, wherein:
said display means further includes sensory indicating circuits.

* * * * *